Jan. 10, 1967  H. W. SACHS  3,296,712
GRIPPER DRYING TUNNELS
Filed Aug. 7, 1964  4 Sheets-Sheet 1
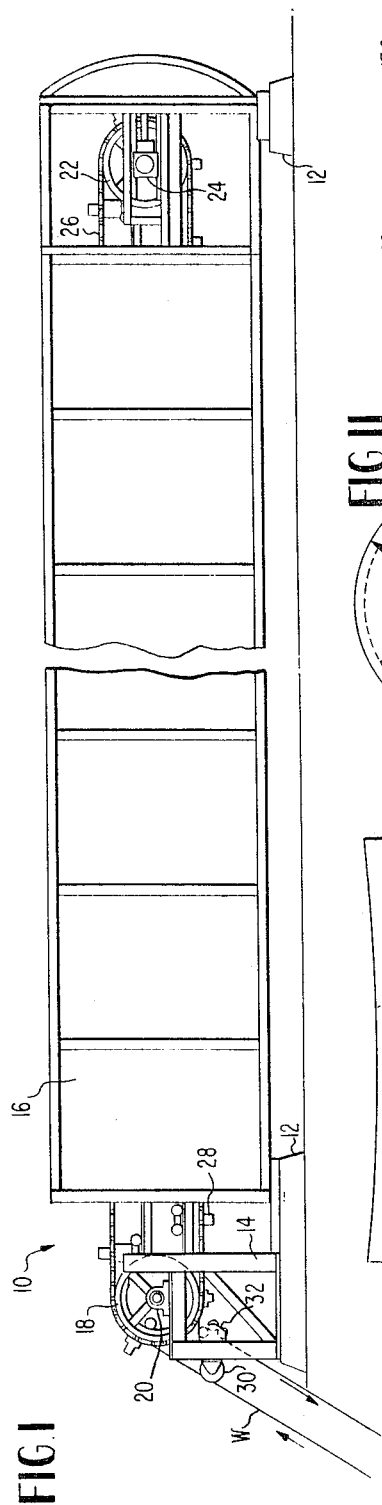
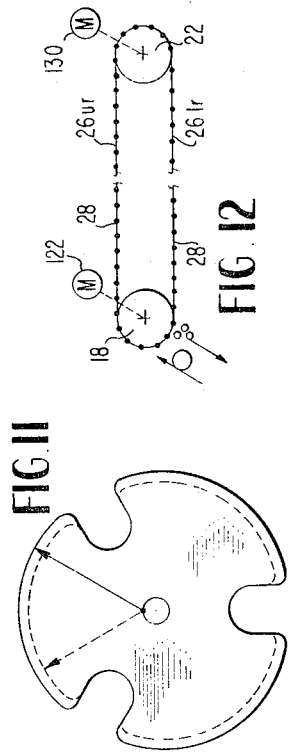
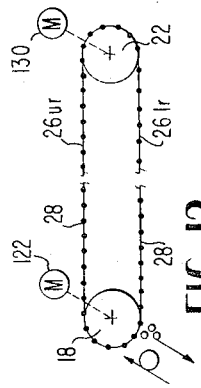
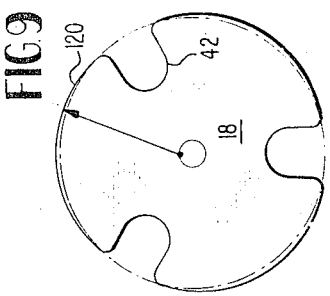
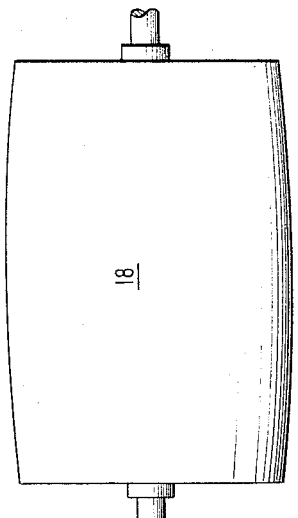
INVENTOR
HANS WERNER SACHS
BY Sughrue, Rothwell, Mion, Zinn & Macpeak
ATTORNEYS

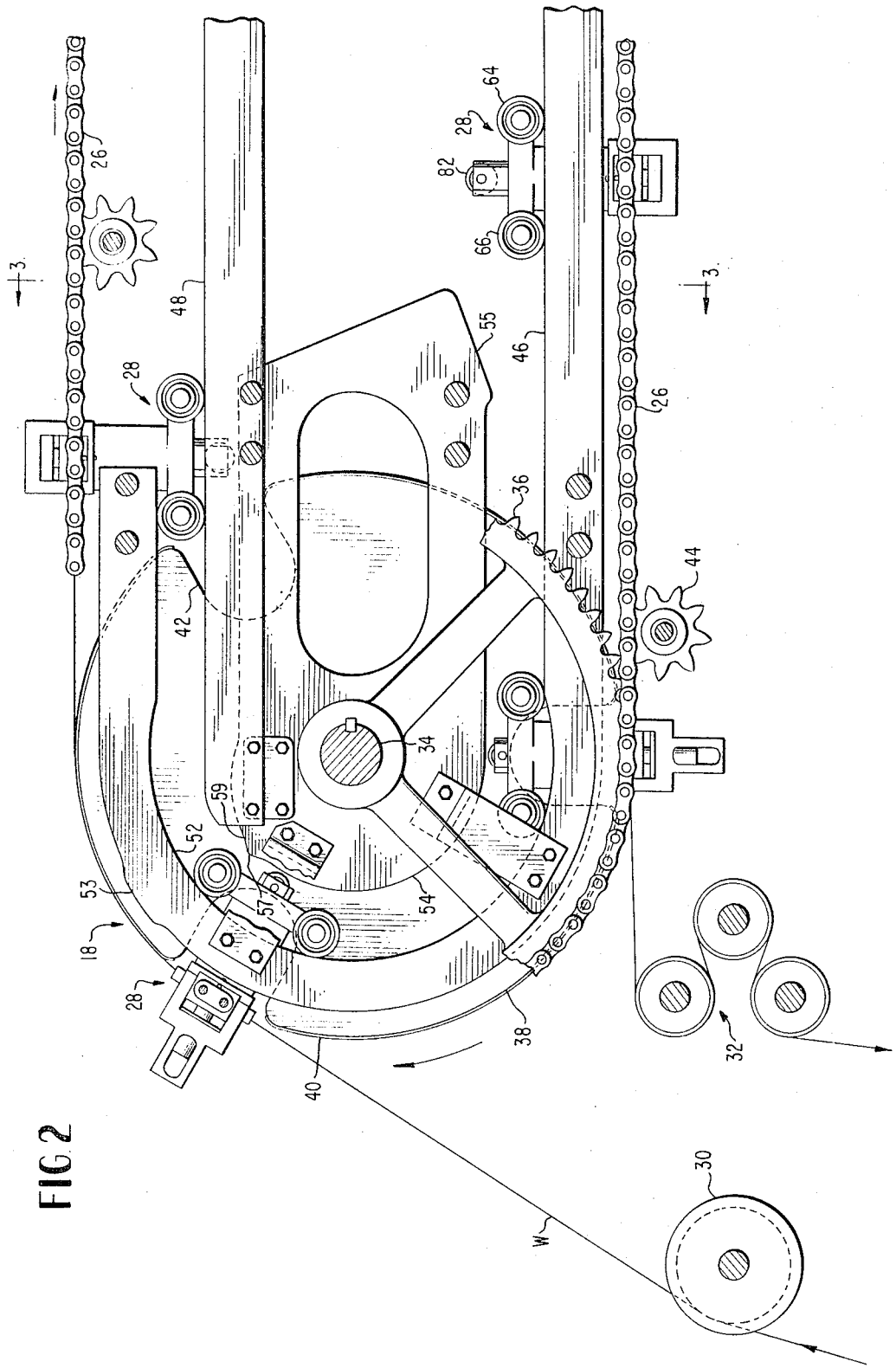

Jan. 10, 1967 H. W. SACHS 3,296,712
GRIPPER DRYING TUNNELS
Filed Aug. 7, 1964 4 Sheets-Sheet 4
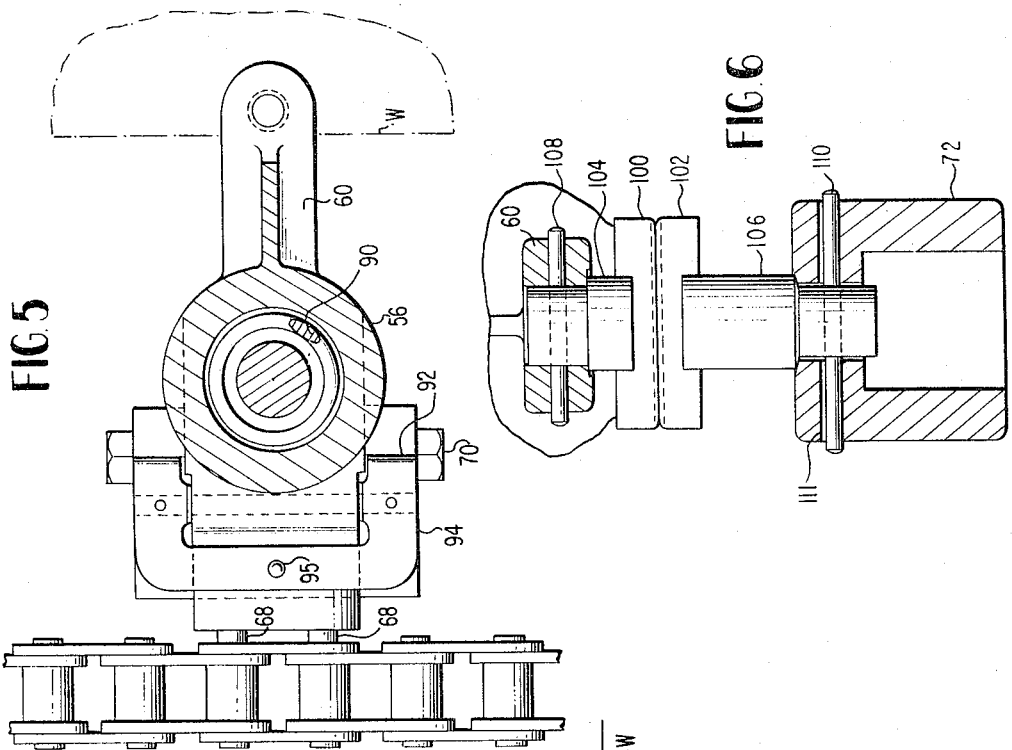
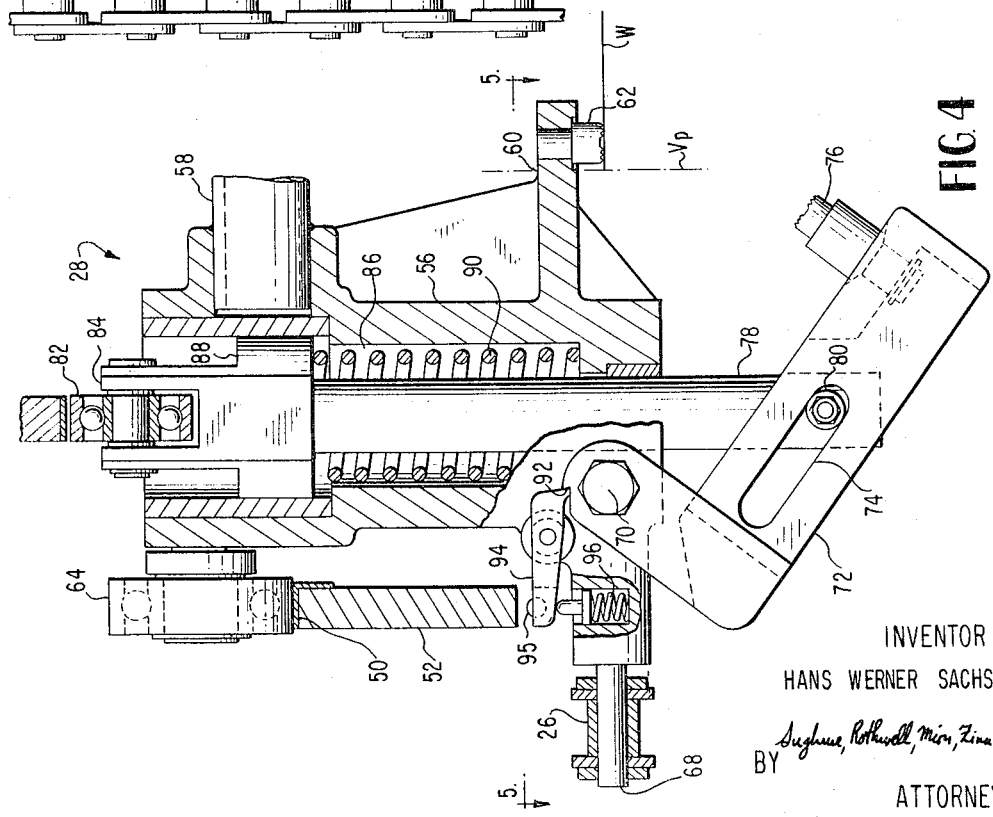
INVENTOR
HANS WERNER SACHS
BY Sughrue, Rothwell, Mion, Zinn & Macpeak
ATTORNEYS

United States Patent Office 3,296,712
Patented Jan. 10, 1967

3,296,712
GRIPPER DRYING TUNNELS
Hans W. Sachs, 29 Virginia Ave.,
Binghamton, N.Y. 13905
Filed Aug. 7, 1964, Ser. No. 388,209
14 Claims. (Cl. 34—158)

This invention relates to improvements for web dryers of the type employing a plurality of grippers supported from endless chains or the like to grip a web by the edges and carry it through a drying tunnel.

Grippers to hold a continuous web at its edges while transporting the web through a device employed for treatment such as drying, are well known in the art. For example, in the textile industry they are frequently used in so-called tenter frames. In a device of this type, the grippers are carried—more or less contiguously—on a pair of moving conveyor chains, one chain for each edge of the web. By means of sprockets arranged at both ends of the conveyor run, the chains are made to form endless loops. Both chains with both chain strands travel in the same horizontal plane. When it is desired to stretch the web while traveling through the tenter frame, the chains, instead of being parallel which is their basic position, may be angled such as to diverge from a closer spacing at the beginning to a wider spacing at the end of the tenter frame.

It is in the nature of the tenter frame that only one strand at each chain, i.e. the strand next to the web, can and will function to carry the web while the other strand merely serves as a return run which brings the grippers back to the point of web entry. Tenter frames may be arranged in tandem so that the web passes from one to the other. No matter how many frames are coupled in this manner, the web will always enter at one end of the assembly and, after a straight horizontal run, leave at the other, opposite end. Tenter frame arrangements cannot be used to carry the web back to or near the point of web entry.

In tenter frames, the grippers are spread open or are closed by means of cams at both ends of the conveyor run. The cams may be stationary or mounted on the sprockets. When in the active, web-carrying strand, the grippers may be held closed by a spring incorporated in the mechanism of each grippers, or by cam rails which are arranged externally along the active conveyor run. Since the web arrives traveling in the same plane in which the grippers move, and since the web also leaves in the same plane, the grippers need only be opened to an extent which slightly exceeds the thickness of the web; this will be sufficient to permit entry of the web between gripping surfaces of the grippers.

Grippers have also been used to carry coated photographic film webs through a drying tunnel. In this application of known prior art gripper drying tunnels, one conveyor chain each is also used along each edge of the web, but each chain travels in its own vertical plane which is parallel to the plane of the other chain. In this way it is possible to take in the web at one end of the conveyor assembly, carry it to the other end and, without releasing it, carry it over and around a return drum coupled with sprockets for the chains, and then back to the entrance end of the conveyor assembly. This permits the arrangement of a drying tunnel around the outgoing strand of the conveyor, and a second drying tunnel around the returning strand of the conveyor, i.e. one tunnel is placed above the other. Compared with a tenter frame, the longitudinal space requirements are cut in half. This invention relates to improvements in gripper drying tunnels of this general type.

When used for drying of photographic film or films of similar nature, the grippers, due to the inherent strength of a film web, are not placed in a contiguous manner; rather, they are arranged an appreciable distance apart, such as 30″ for example. At the sprockets on one end of the assembly, cams are employed to open the grippers for release of the dry web, to keep the grippers open while traveling about the sprockets and until the freshly coated part of the web has entered between the grippers, and cams are also employed to permit closing of the grippers after the web is in place. During the run through the drying tunnels, the grippers are held closed by springs incorporated in the mechanism of each gripper.

The known gripper arrangement for photographic film described above has the effect of carrying the web in such manner that, with the exception of possible brief support at the return drum under very light pressure, neither the coated nor the uncoated side of the web comes in contact with any other surface, such as rollers, thereby preventing scratches, abrasions and other damage to the web.

In the application for photographic film employing chains, as described, the grippers must cross the vertical planes laid through the edges of the web when it arrives and leaves, and they must therefore be opened to an extent sufficient to have the movable gripper head completely clear a vertical plane laid through the edge of the web. In the past and known prior art this requirement has been met by means of two motions applied to the movable gripper head—one motion to lift the head and another motion to turn it out of the way by about 90°. The two-motion gripper design is structurally weak and has led to mechanical difficulties, especially at high conveyor speeds.

Therefore it is an object of this invention to provide a gripper drying tunnel incorporating an improved gripper construtction that moves clear of the web by a single sweeping motion of the movable gripper head in a single plane, thereby permitting greater strength and stability in the construction.

A further object of this invention is to provide a unique construction for locking of the gripper head in open position. The gripper lock greatly reduces the extent of the cams needed at the front drum; only one short cam is needed to open the gripper and lock it open, and another short cam to release the gripper head and permit it to close. No cam is needed to hold the gripper open while traveling about the front drum. In this manner power requirements as well as cam wear are minimized.

An additional object of this invention is to provide for extension of the gripping surface of the grippers in longitudinal direction parallel to the edge of the web. An increase in the area of the gripping surface may be required if for instance the velocity of the drying air impinging upon the web, and thereby the pressure on the web is increased beyond a certain limit. Such an increase in gripping surface could be obtained by a larger diameter for the gripping surface of a circular gripper button but this would also increase the width of the uncoated selvage edge which must be provided on both sides of the web. A longitudinal extension of the gripping surface as in this invention increases the area without increasing the width of the selvage edge.

The lateral spacing of the grippers, i.e., their distance measured across the web, and—in terms of numbers of chain links—also the longitudinal spacing of the grippers are both constant throughout the travel path of the conveyor chains. Without any other provisions it is possible to handle and dry webs which have not appreciably changed their dimensions (generally: expanded) due to wetting during the coating process before entry between grippers, which expand, due to moisture absorption, to a moderate extent while between grippers, and which subsequently, during drying, shrink again to or near their initial dimensions prevailing at entry into the dryer. However, when, for one or the other reason, shrinkage of the web at the end of the drying cycle results in web dimensions which are below those with which the web has entered between the grippers, special compensating provisions are required, and it is another object of this invention to provide such compensation for excess web shrinkage.

In the known art of gripper drying tunnels, a motor drive is provided for only the entrance drum of the gripper conveyor (and this is the logical place for the drive motor due to load requirements). However, this arrangement produces a gripper spacing at the point of web entrance which is smaller than the gripper spacing at the point of web release, and this variation of gripper spacing exerts tensional stresses (stretching) on the web.

Another object of this invention is to overcome, minimize, equalize or reverse the undesirable variation in gripper spacing just described—the exact action and result depending on the torque exerted on the conveyor chains by another motor on the return drum. This motor is to maintain constant tension of a given magnitude in the chain strands pulled by the drive sprockets connected to it and the amount of this tension can be varied and preset within certain limits. Thus, this motor will be able to hold the gripper spacing approximately equal throughout the entire conveyor run, or produce a greater gripper spacing at the point of web entry than at the point of web release.

The foregoing and other objects, features and advantages of the invention will be apparent from the following more particular description of a preferred embodiment of the invention, as illustrated in the accompanying drawings.

In the drawings:

FIGURE 1 is a side elevational view of a gripper drying tunnel.

FIGURE 2 is an enlarged side elevational view of the head drum and associated grippers, carrying chain, and other components associated with the head drum.

FIGURE 4 is a detail view, partly in section, showing an individual gripper assembly on an enlarged scale.

FIGURE 5 is a sectional view taken along line 5—5 of FIGURE 4.

FIGURE 6 is an enlarged elevational view, partially in section, of the jaws of the gripper, illustrating elongated gripping surfaces.

FIGURE 7 is a schematic illustration of the head drum having a concave periphery.

FIGURE 8 is a schematic illustration of the head drum with a convex periphery.

FIGURE 9 is a schematic illustration of the head drum from one end thereof, illustrating eccentric lobes therein.

FIGURE 10 is a schematic illustration of the end of a head drum having eccentric lobes and a convex periphery.

FIGURE 11 is a schematic illustration of the head drum looking at it from one end, showing eccentric lobes and a concave periphery.

FIGURE 12 is a schematic illustration of the driving arrangement for head and return drums of the tunnel dryer.

Figure 3:
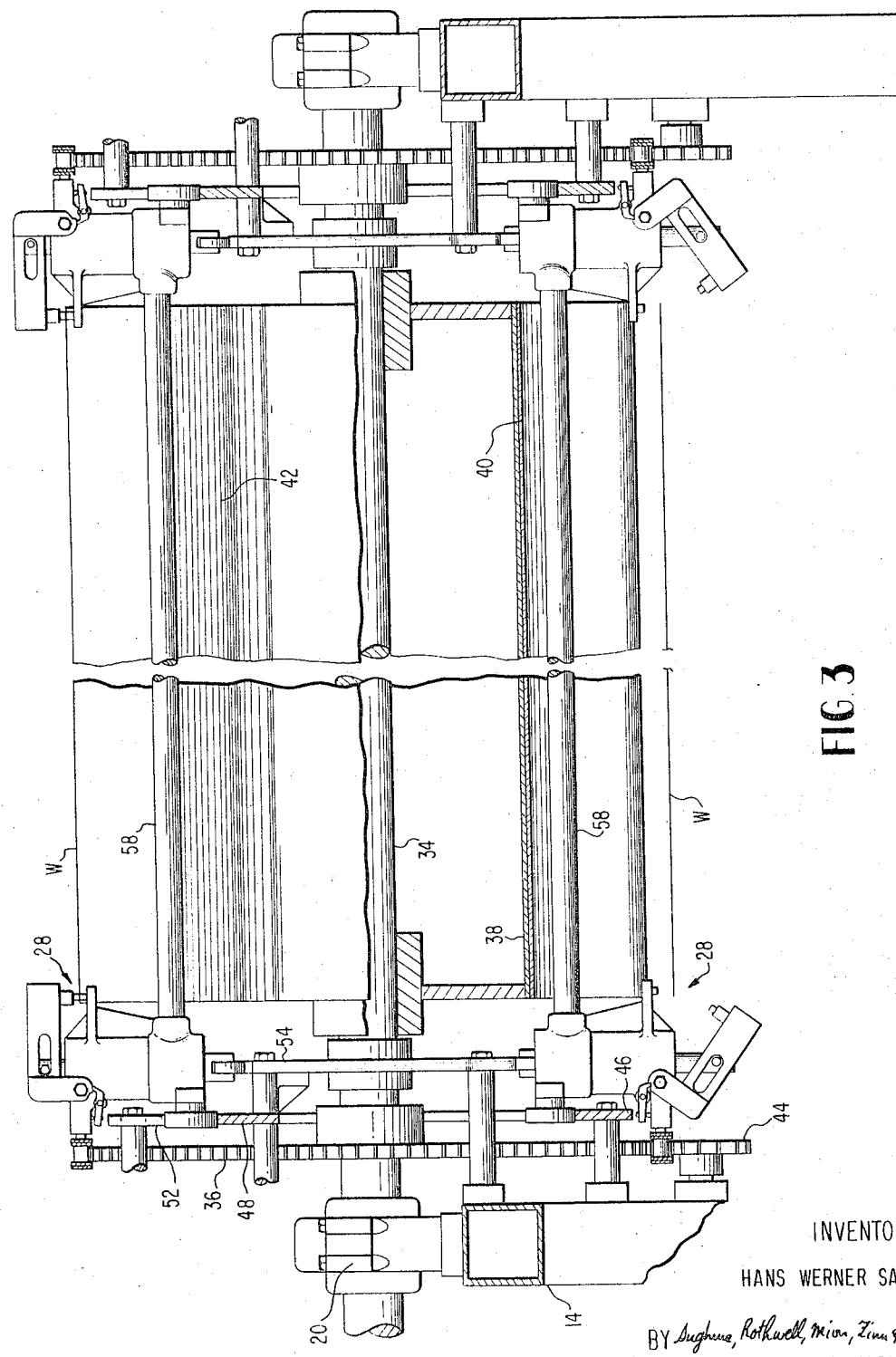
FIGURE 3 is a sectional view taken along line 3—3 of FIGURE 2 and showing the head drum and related components in an end elevational view, and partly in section.

Referring now to FIGURE 1, a gripper drying tunnel 10 is shown in a somewhat general manner. This tunnel is of the type wherein a web to be dried enters over a head drum, goes through the drying tunnel and around a return durm to exit from underneath the head drum as it leaves the tunnel.

The gripper drying tunnel has suitable foundations 12 which carry structural supporting framework 14. A tunnel housing 16 encloses most of the web during its travel, and this housing has suitable supply and exhaust ducts and passages therein for supplying drying gases such as hot air to the web on both runs through the tunnel. The tunnel is illustrated with broken lines in FIGURE 1 as in practice the tunnel might be up to several hundred feet long.

At the entrance to the tunnel there is a head drum assembly 18 rotatably supported on bearings 20. The web passes over the head drum 18 and is held along its selvage edges by grippers 28 as it passes down through the tunnel over return drum 22 and returns, all while being held by the grippers. The return drum is supported on suitably adjustable bearings 24. There are a plurality of gripper assemblies 28 carried by a pair of endless gripper chains 26 which move in the same plane and path as the web.

The web to be dried enters the drying tunnel over flanged entrance guide roller 30 and is gripped by the grippers 28 at the head drum when carried through the tunnel around the return drum 22 and then back out to the lower side of head drum 18 where it leaves over a geared roller cluster 32 provided for web take-off.

Referring now to FIGURES 2 and 3 for more detail of the head drum assembly 18, it is noted that the head drum has a central support shaft 34, one end of which is driven. Attached to the shaft 34 at each end of the drum is a roller chain sprocket 36. A generally hollow cylindrical drum 38 is also attached to support shaft 34 and this drum may have a lining of felt 40 on its periphery. The periphery of the drum also includes a plurality of pockets 42 extending across the drum and spaced apart a circumferential distance equal to the distance between adjacent gripper assemblies 28. The pockets 42 accommodate cross rods between opposed gripper assemblies.

Also, on each end of the drum are, supported from the structural supporting framework 14, chain support sprockets 44, lower support rails 46, and upper support rails 48. The support connections for these support rails are shown in FIGURE 3, and shown in section in FIGURE 2. The support rails 46 and 48 also have a hardened rail cap 50, FIGURE 4. The lower rails 46 blend into a stationary outer curved support rail 52.

For actuating the gripper assemblies there is provided a stationary cam 54 laterally offset from the support rails. Even though a mechanism, to lock the grippers in open position while traveling around the head drum, is not essential for the basic operation of my gripper design, and while cam 54 can readily and easily be formed to raise the movable gripper jaw (by surface 55) and keep it in open position until the web is located on the fixed jaws whereupon the movable jaw would be closed again (by surface 57), I have shown my grippers equipped with such locking mechanism. To this end, the cam 54 has a gripper opening inclined surface 55 and, optionally, a gripper lock tripping surface 57. Rail 52 has a cam surface 53 for cooperating with the gripper assembly to release a gripper lock.

Each gripper assembly 28 is identical and these gripper assemblies are spaced apart a constant number of chain links along each endless gripper chain 26. An individual gripper assembly 28 constituting one of the significant improvements of this invention is shown in detail in FIGURES 4–6. Referring to FIGURE 4, the gripper assembly 28 includes a gripper body 56 to which is secured a cross gripper connecting rod 58. The connecting rod 58 connects gripper assemblies on opposite sides of the web rigidly together and this connection is shown in more detail in FIGURE 3. The gripper body 56 also includes a fixed jaw extension 60 carrying a fixed jaw friction element 62 which is removable.

A pair of ball bearing support rollers 64 and 66 are attached to the body 56 in the manner illustrated in FIGURES 2 and 4. Each gripper assembly 28 is positively attached to the roller chain 26 by a pair of chain fixing pins 68.

The body 56 also carries a pivot 70 for a movable gripper jaw 72. Movable gripper jaw 72 includes an elongated slot 74 and carries on its outer end a friction element 76 which is likewise removable.

An actuating rod 78 is mounted for axial movement within the body 56 and includes on its lower end a transverse pin 80 cooperating with slot 74. A cam follower roller 82 is supported by yoke 84 at the top of actuating rod 78. The actuating rod 78 slides within bore 86 in gripper body 56 and is guided by means of guide collar 88. Beneath the guide collar 88 and within the body 56 is a jaw closing spring 90. As is evident from FIGURE 4, pressing down on cam follower 82 by means of inclined cam surface 55 (FIGURE 2) will compress spring 90 and move rod 78 down which in turn will cause pin 80 to slide in slot 74 pivoting lower jaw 72 about pivot 70. The extent of this swinging pivotal movement is such that the entire lower jaw 72 swings clear of a vertical plane $V_p$ through the edge of web W. This allows the grippers to travel in a vertical plane and also allows the web to enter and leave this vertical plane of the grippers without interference by the grippers.

The movable jaw 72 could be held open by cam pressure from the time the web W leaves the head drum until the gripper has moved around and allows the web W to come to rest on the fixed jaws before closing on the edge thereof, and my gripper mechanism would be fully functional if operated in this manner. However, continuous cam pressure against the force of spring 90 would create stresses in the assembly and wear on cams and followers, and this invention includes the unique locking device for locking the movable gripper jaw 72 in its open position for a predetermined period of time and then tripping the lock and allowing the spring 90 to close the gripper jaws on the incoming web. This locking arrangement includes a notch 92 in the lower jaw 72 for cooperation with a pivoted pawl 94. A spring arrangement 96 biases the pawl 94 toward engagement with notch 92.

Reference may be had to FIGURES 2 and 4 for an explanation of the opening, locking open of the grippers, and closing thereof. Gripper assembly 28 is pulled along by the lower run of chain 26 in FIGURE 2 while being supported by rollers 64 and 66 on the lower rail 46. The leading inclined surface 55 of stationary cam 54 is in the path of cam follower 82 and as the gripper assembly is pulled under stationary cam surface 55, the actuating rod 78 is pushed downward against the force of spring 90, opening the lower gripper jaw 72 to clear the edge of the web and allowing the web W to leave the grippers over the geared cluster of rolls 32. The arrangement of cam surface 55 and rail 46 is such that there will be an overtravel during the opening movement to allow spring 96 to force pawl 94 into the notch 92 and hold the lower jaw 72 in an open position as the gripper assembly passes around the front end of head drum 38.

After incoming web W enters between the opened gripper assemblies, as shown in FIGURE 2, the cam surface 57 in the path of cam follower 82 causes the cam follower 82 and actuating rod 78 to open the jaws slightly further and at this time cam surface 53 on the outer side of rail 52 cooperates with a ball 95 on the top of pivoted pawl 94 and compresses spring 96 releasing the lower jaw 72 and it closes by the force of jaw closing spring 90 after passing off cam surface 57. The cam shoulder 59 following cam surface 57 is designed to effect gradual and controlled motion of actuating rod 78.

The extension of the gripping surfaces of the friction elements 62 and 76 in a longitudinal direction parallel to the edge of the web is illustrated in FIGURE 6. In this case the friction gripper elements 100 and 102 are generally rectangular bars and extend in a direction parallel to the edge of the web. This increases the gripper surface if necessary due to the forces on the web occasioned by the web weight and the velocity of the drying air impinging on the web. As can be seen, a circular gripper such as shown in FIGURE 5 could be enlarged but this would also enlarge the selvage edge of the web. However, by extending the gripper parallel to the edge of the web additional gripper surface can be obtained without increasing the width of the selvage edge. Although FIGURE 6 illustrates a rectangular gripper surface and this provides greatest possible active gripping surface which can be obtained, other arrangements are feasible to give a smaller size active gripping area such as three circular gripping friction elements positioned in a row along the selvage edge mounted in a carrying bar and possibly backed by springs.

It is noted that the gripper bar friction elements 100, 102 in FIGURE 6 are mounted in suitable supports 104 and 106 which, by means of pins 108 and 110, are secured to the upper fixed jaw 60 and the lower movable jaw 72, respectively. Pin 108 is drawn in tightly to prevent rotation of bar 100 and other movement. The pin 110 is mounted tight in support 106 and in a slightly oversize slot 111 to permit gripper bar 102 to find its own level when coming into contact with companion bar 100. The web gripping surfaces of friction elements 100, 102 may be knurled or have parallel or herringbone ridges or any other suitable configuration to provide the requisite gripping friction. Also, pilot guides (not shown) may be used to guarantee mutual alignment of gripper bars and eliminate effects of play.

It is possible that webs being handled and dried in the tunnel dryer shrink during drying after first having expanded due to wetting during the coating process and before entry into the grippers. This invention provides a unique arrangement for compensating for excess web shrinkage, both laterally across the web and longitudinally along the web. The compensation for lateral excess web shrinkage is accomplished by using a head drum 18 having a concave periphery as shown in FIGURE 7, or a convex periphery as shown in FIGURE 8. Either arrangement causes the web to form a lateral catenary as it enters the head drum and when it is taken in by the grippers as advance compensation for shrinkage during passage through the dryer. Thus, when the edges are gripped after first passing over a concave or convex roll, the web will sag slightly and therefore if there is subsequent shrinkage of the web in lateral direction beyond web entrance dimensions, it will not cause difficulties.

In cast webs there is no grain in any one direction and therefore shrinkage would occur not only in lateral but also in longitudinal direction. Therefore, means are provided in this invention to also compensate for shrinkage in a longitudinal direction. FIGURE 9 illustrates the principle to compensate for shrinkage in a longitudinal direction by eccentric lobes 120 on surface of head drum 18 between adjacent pockets 42. As illustrated in FIGURE 9, the center of curvature of lobes 120 is not at the center of support of drum 18 or at the center of the path of the chain around the head drum. Therefore, the length of the web held between two grippers would be extended beyond the corresponding length of arc of drum 18. This places longitudinal slack in the web when it is taken in by the grippers, as advance compensation for shrinkage during passage through the dryer, and this slack is used to compensate for subsequent shrinkage of the web in a longitudinal direction beyond web entrance dimensions.

FIGURES 10 and 11 illustrate the combining of the features of the head drums shown in FIGURES 7, 8 and 9. In FIGURE 10 there is shown a head drum having both eccentric lobes 120 and a convex periphery of the type shown in FIGURE 8. FIGURE 11 also shows a head drum having eccentric lobes 120 and a concave periphery of the type shown in FIGURE 7. The arrangements of FIGURES 10 and 11 compensate for shrinkage in both lateral and longitudinal dimensions at the same time.

Referring now to FIGURE 12, this figure illustrates control of gripper spacing along the chain tracks. The drive for the chains is through the head drum shaft by motor 122 as illustrated in FIGURE 12. This is the basic drive for the conveyor and the head drum is a good location since opening and closing of the grippers places the greatest load on the system at the head drum. However, if the only drive for the system were at the head drum, the lower run 26*lr* of the chain would be taut while the upper run 26*ur* of the chain would have slack. The lower run of the chain 26*lr* will be most taut just before the head drum where the load of the conveyor system is concentrated. In turn, the greatest amount of chain slack will occur in the upper run of the chain 26*ur* just beyond the head drum.

Where the chain is relatively slack, for example in the upper run 26*ur* and especially right after head drum 18 preceding gripper closing, the spacing between succeeding grippers 28 which travel on rails will be a minimum while in the taut section of the conveyor 26*lr* and especially just before the head drum 18 preceding web release, the spacing between succeeding grippers will be a maximum. This is because the total length of each chain is necessarily greater than twice the center distance between drums plus one sprocket periphery, and also because there is some play or tolerance in every joint of the conveyor chains 26, which are roller type chains, and this play is taken up in the taut section adding to the spacing between succeeding grippers. This can be significant in a drying tunnel in the order of several hundred feet long. If, in the arrangement as illustrated in FIGURE 12 only motor 122 is employed, the web W is taken in and closed upon by the grippers at the time when the spacing between the grippers is at a minimum and the web is released after drying when the spacing between the grippers is a maximum. The net result is a stretching of the web during its travel through the dryer, and this takes place independently of any drying shrinkage occurring in the web. In a typical web material of plastic characteristics stretching in one (i.e. longitudinal) direction will produce a contraction in the other (lateral) direction.

This invention overcomes this problem by correcting, equalizing, or even reversing the variation in gripper spacing by the addition of a further motor 130 for exerting a force on the return drum 22. The exact result produced by motor 130 depends on the torque it exerts. The purpose of motor 130 is to transfer the conveyor chain slack, at a variable, preset extent from the upper run of the chain 26*ur* to the lower run 26*lr*. In effect then, both motor 122 and 130 combine in driving the conveyor. The torque is adjustable but is set to remain constant at any given point in the speed range. The motor 130 operates as a constant horsepower also known as a "torque" motor and its speed is controlled by the speed of motor 122.

Also, one or several such motors 130 may be employed to engage and pull the chains not by driving the sprockets connected to the shaft of drum 22, but by using sprockets which engage the chains anywhere along the straight chain runs, either near drum 22 or farther away from it.

It can thus be seen that applicant has disclosed a unique set of improvements in gripper dryer tunnels including a single motion gripper in which the gripper head pivots to move in a single plane and clear the web for entrance and exit from the tunnel. This single motion gripper also leads to additional improvements in a unique locking arrangement to hold the gripper head in open position and allows for extension of the gripper surfaces in a longitudinal direction. Further improvements included in this invention are the unique shape of the head drum surface to compensate for excess web shrinkage and a novel drive arrangement for the chain conveyor to control gripper spacing along the conveyor chains by controlling the tautness and slackness of both runs of the conveyor at will.

While the invention has been particularly shown and described with reference to a preferred embodiment thereof, it will be understood by those skilled in the art that various changes in form and details may be made therein without departing from the spirit and scope of the invention.

I claim:

1. In an elongated drying tunnel for drying a moving web entering the tunnel over a head drum passing over a return drum and leaving the tunnel adjacent the head drum, by means of gases contacting the web, the tunnel being of the type including a plurality of openable grippers attached to endless conveyor chains which run in vertical planes parallel to the edges of the web being dried, the improvements comprising; each of the operable grippers having a body including a fixed gripper jaw and a movable gripper jaw pivoted therefrom, the grippers being attached to the chain such that the fixed gripper jaws of all grippers are inside the path of travel of the endless chain and the web, a reciprocable cam follower for each gripper movable in a vertical line perpendicular to the plane of the web, each cam follower connected to a gripper for opening and closing the movable jaw thereof in only one direction with a single movement and to an extent to clear a vertical plane through the edges of the web, a compression spring directly contacting the cam follower to urge the movable gripper jaw to a closed position and a two-dimensional stationary cam positioned to cause reciprocation of the cam follower to open the movable jaws at the point the web leaves the tunnel and subsequent closing after receiving a web.

2. A gripper drying tunnel as defined in claim 1, wherein the head drum at the web entrance to the tunnel has a concave periphery to cause the web to form lateral slack when taken by the grippers.

3. A gripper drying tunnel as defined in claim 1, wherein the head drum at the web entrance to the tunnel has a convex periphery to cause the web to form lateral slack when taken by the grippers.

4. A gripper drying tunnel as defined in claim 1, wherein the head drum at the web entrance having a plurality of recesses extending longitudinally thereof to accommodate bars rigidly connecting an opposed pair of grippers between the two carrier chains, the surfaces of the drum between the recesses being extended into the normal circular path of the web to form longitudinal slack in the web.

5. A gripper drying tunnel as defined in claim 1, further comprising a motor for driving the chains connected to a head drum and a further motor for redistributing slack in the chains.

6. A gripper drying tunnel as defined in claim 2, wherein the head drum at the web entrance having a plurality of recesses extending longitudinally thereof to accommodate bars rigidly connecting an opposed pair of grippers between the two carrier chains, the surfaces of the drum between the recesses being extended into the normal circular path of the web to form longitudinal slack in the web.

7. A gripper drying tunnel as defined in claim 3 wherein the head drum at the web entrance having a plurality of recesses extending longitudinally thereof to accommodate bars rigidly connecting an opposed pair of grippers between the two carrier chains, the surfaces of the drum between the recesses being extended into the normal circular path of the web to form longitudinal slack in the web.

8. A gripper drying tunnel as defined in claim 5, wherein the further motor is a constant horsepower motor and is connected to the return drum.

9. A tunnel dryer for drying a moving web having a return run by means of heated gas contacting the web, the tunnel dryer comprising; a tunnel, a head drum, a return drum, spaced in the tunnel from the head drum sprockets at each end of the drums spaced, endless conveyor chains trained around the sprockets, a plurality of openable grippers attached to the endless conveyor chains, which chains are in vertical planes laid perpendicular to a web being dried and parallel to the edges of a web being dried, each of the openable grippers including at least one movable gripper jaw, the grippers being attached to the chain such that the movable gripper jaw of each gripper is outside the path of travel of the endless chain and the web, a reciprocable cam follower carried by each gripper for opening and closing the movable jaw thereof by moving it back and forth only, in one plane to an extent to clear a vertical plane laid through the edge of the web, a compression spring directly acting upon the cam follower and a two-dimensional stationary cam positioned to cooperate with the cam follower to cause opening of the movable jaw of each gripper carried by the chains at the point the web leaves the tunnel and to cause closing of the movable jaw of each gripper after a web enters the dryer.

10. A gripper drying tunnel as defined in claim 9 further comprising motor means for driving the head drum, and further motor means removed from the head drum for driving the chains and the further motor means operatively related to the motor means to redistribute the slack in the chains between the drums.

11. A tunnel dryer for drying a moving web having a return run by means of heated gas contacting the web, the tunnel dryer comprising; a tunnel, a head drum, a return drum, spaced in the tunnel from the head drum, sprockets at each end of the drums, spaced endless conveyor chains trained around the sprockets, a plurality of openable grippers attached to the endless conveyor chains, which chains are in vertical planes laid perpendicular to a web being dried and parallel to the edges of a web being dried, each of the openable grippers including at least one movable gripper jaw, the grippers being attached to the chain such that the movable gripper jaw of each gripper is outside the path of travel of the endless chain and the web, cam follower means carried by each gripper for opening and closing the movable jaw thereof by moving it back and forth only, in one plane to an extent to clear a vertical plane laid through the edges of the web, stationary cam means positioned to cooperate with the cam follower to cause opening of the movable jaw of each gripper carried by the chains at the point the web leaves the tunnel and to cause closing of the movable jaw of each gripper after a web enters the dryer, a locking detent carried by the gripper for locking the movable gripper jaw in open position, and a stationary cam lock tripping means for releasing the locking detent after the entering web reaches the position where it is engageable by the gripper jaws.

12. A gripper drying tunnel as defined in claim 11, further comprising friction gripping surfaces on the gripper jaws extending longitudinally in the direction of the web edge.

13. An improvement for compensating for shrinkage in a web being dried in a tunnel while carried by spaced grippers attached to carrying chains which in turn are trained about sprockets on a head drum and a return drum, the improvement comprising; web slack inducing shaped means on the surface of the head drum to cause the incoming web to form compensating slack in at least one desired direction prior to being gripped and held by the grippers and travelling through the tunnel.

14. In an elongated drying tunnel for drying a moving web entering the tunnel over a head drum passing over a return drum and leaving the tunnel adjacent the head drum, by means of gases contacting the web, the tunnel being of the type including a plurality of openable grippers attached to endless conveyor chains which run in vertical planes parallel to the edges of the web being dried, the improvements comprising; each of the operable grippers having a body including a fixed gripper jaw and a movable gripper jaw pivoted therefrom, the grippers being attached to the chain such that the fixed gripper jaws of all grippers are inside the path of travel of the endless chain and the web, cam follower means carried by each gripper for opening and closing the movable jaw thereof in only one direction with a single movement and to an extent to clear a vertical plane through the edges of the web, stationary cam means positioned to cooperate with the cam follower to cause opening of the movable jaws at the point the web leaves the tunnel and subsequent closing after receiving a web, locking means for locking the movable gripper jaw in open position, and stationary lock tripping means for releasing the locking means after the point where the entering web is engageable by the gripper jaws.

References Cited by the Examiner
UNITED STATES PATENTS

| | | | |
|---|---|---|---|
| 1,025,853 | 5/1912 | Bartholomew | 198—179 |
| 1,472,902 | 11/1923 | Bulkeley | 34—158 |
| 1,613,445 | 1/1927 | Davis | 34—12 |
| 1,682,356 | 8/1928 | Solomon | 34—162 X |
| 1,999,587 | 4/1935 | Davis | 34—162 X |
| 2,135,516 | 11/1938 | Hurxthal | 34—121 X |
| 2,393,563 | 1/1946 | Petterson | 198—203 |

FREDERICK L. MATTESON JR., *Primary Examiner.*

A. D. HERMANN, *Assistant Examiner.*

UNITED STATES PATENT OFFICE
CERTIFICATE OF CORRECTION

Patent No. 3,296,712 January 10, 1967

Hans W. Sachs

It is hereby certified that error appears in the above numbered patent requiring correction and that the said Letters Patent should read as corrected below.

Column 1, line 45, for "grippers" read -- gripper --; column 2, line 36, for "construtction" read -- construction --; column 4, line 44, before "rail" insert -- surface or a separate hardened --; column 6, line 10, for "gripper" read -- gripping --; column 9, line 3, for "drums" read -- drums, --.

Signed and sealed this 28th day of November 1967.

(SEAL)
Attest:

Edward M. Fletcher, Jr.
Attesting Officer

EDWARD J. BRENNER
Commissioner of Patents